United States Patent [19]
Kono et al.

[11] Patent Number: 5,779,595
[45] Date of Patent: Jul. 14, 1998

[54] SLIP CONTROL APPARATUS FOR MOTOR VEHICLE LOCK-UP CLUTCH

[75] Inventors: Katsumi Kono, Toyota; Shinya Nakamura, Owariasahi; Atsushi Honda, Susono, all of Japan

[73] Assignee: Toyota Jidosha Kabushiki Kaisha, Toyota, Japan

[21] Appl. No.: 867,691

[22] Filed: Jun. 3, 1997

Related U.S. Application Data

[62] Division of Ser. No. 501,341, Jul. 12, 1995, Pat. No. 5,683,329.

[30] Foreign Application Priority Data

Jul. 13, 1994 [JP] Japan ................... 6-161294

[51] Int. Cl.$^6$ ................................... F16H 61/14
[52] U.S. Cl. ................... 477/174; 477/64; 477/176
[58] Field of Search ................... 477/174–176, 477/168, 64

[56] References Cited

U.S. PATENT DOCUMENTS

| | | | |
|---|---|---|---|
| 5,018,068 | 5/1991 | Aoki et al. | 477/64 X |
| 5,484,354 | 1/1996 | Vukovich et al. | 477/176 X |
| 5,496,233 | 3/1996 | Ishiguro | 477/175 X |
| 5,616,100 | 4/1997 | Sakai et al. | 477/174 X |
| 5,662,552 | 9/1997 | Fukasawa et al. | 477/176 X |

*Primary Examiner*—Khoi Q. Ta
*Attorney, Agent, or Firm*—Oblon, Spivak, McClelland, Maier & Neustadt, P.C.

[57] ABSTRACT

An apparatus for controlling a lock-up clutch between pump and turbine impellers in a fluid-filled power transmitting device of a motor vehicle, such that a slip control device controls the actual slip speed of the lock-up clutch so as to coincide with a transient target slip speed, the apparatus including a device for calculating a final target slip speed of the lock-up clutch which assures a maximum fuel economy of the vehicle during a steady-state running, a device for setting, as an initial value of the transient target slip speed, a difference between the speeds of the pump and turbine impellers immediately before an operation of the slip control device is initiated, and a device for reducing the transient target slip speed toward the final target slip speed at a rate which decreases as the transient target slip speed approaches the final target slip speed.

4 Claims, 14 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | | | |
| R | | ⊗ | ⊗ | | ○ | | | | ○ | | | | |
| N | | ⊗ | ⊗ | | | | | | | | | | |
| D | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | ○ | ○ | | | | ○ | ○ | |
| | (O/D) | × | × | ○ | ○ | | ○ | | | | | | ○ |
| L | 1st | ○ | × | ○ | | | | | | ○ | ○ | ○ | |
| | 2nd | ○ | ○ | ○ | | ○ | ○ | ○ | ○ | ○ | ○ | ○ | |

FIG. 2

SLIP CONTROL APPARATUS FOR MOTOR VEHICLE LOCK-UP CLUTCH

This is a Division, of application Ser. No. 08/501,341 filed on Jul. 12, 1995, now U.S. Pat. No. 5,683,329.

BACKGROUND OF THE INVENTION

1. Field of the Invention

The present invention relates to an apparatus for controlling the amount of slip of a lock-up clutch provided in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, it is proposed to control the lock-up clutch in a slip control mode (partially slipping or engaging mode) such that an actual amount of slip (slip speed) of the lock-up clutch, namely, a difference between the speeds of a pump impeller and a turbine impeller eventually coincides with a predetermined target slip speed, for the purpose of improving the fuel economy of the vehicle while minimizing the power loss due to slipping of the lock-up clutch. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by suitable parameters (e.g., throttle valve opening and vehicle running speed) indicative of the vehicle running condition.

Usually, a lock-up clutch whose slip speed or amount is adjustable is provided with a piston which is operated by a hydraulic pressure source that permits full engagement of the lock-up clutch. Described in detail, the piston is moved depending upon a difference between pressures in two oil chambers, which are formed on the opposite sides of the piston. The amount of slip of the lock-up clutch is controlled by controlling the pressure difference of the two oil chambers to thereby change a thrust force acting on the piston and the resulting friction force of the clutch. Since the hydraulic pressure source that permits the full engagement of the clutch is utilized to control the lock-up clutch in the slip control mode, even a small amount of change in the pressure difference of the two oil chambers will result in a considerable amount of change in the slip amount of the clutch. That is, the slip amount of the clutch controlled in a feedback fashion tends to be excessively sensitive to a change of a slip control signal generated by a feedback controller. Thus, the feedback control of the slip amount of the lock-up clutch suffers from comparatively low control stability, such as poor feedback accuracy and an excessive control overshoot leading to deterioration of the power transmission stability of the vehicle, particularly when the slip control is initiated in the presence of a large difference between the actual and target slip speeds of the lock-up clutch immediately after the switching of the control mode from the fully releasing mode to the slip control mode. The low control stability is also encountered when the rate of change of the target slip speed is altered.

An example of a control apparatus for controlling the lock-up clutch in the slip control mode is disclosed in JP-A-4-331868. This controller is arranged such that the speed difference of the pump and turbine impellers upon starting of the slip control is used as an initial value of a transient target slip speed of the lock-up clutch, and such that the transient target slip speed is reduced or decremented at a predetermined constant rate toward a predetermined final target slip speed. In this control apparatus wherein the rate of reduction of the transient target slip speed is constant even when the transient target slip speed is relatively close to the final target slip speed, the transient target slip speed is suddenly fixed at the final target slip speed, and the actual slip speed of the lock-up clutch tends to become lower or smaller than the final target slip speed, that is, tends to become close to zero, due to a control overshoot when the transient target slip speed has reached the final value. Consequently, the lock-up clutch is undesirably almost fully engaged, causing a knocking tendency of the engine running at a relatively low speed, and deteriorated running stability and comfort of the vehicle.

In the conventional control apparatus indicated above, the rate of reduction of the transient target slip speed of the lock-up clutch is determined on the basis of the throttle valve opening and according to a predetermined relation between the rate of reduction and the throttle valve opening. The rate of reduction once determined is held constant until the transient target slip speed is reduced to the final target slip speed. In this arrangement, the determined rate of reduction of the transient target slip speed may be excessively lower or higher than needed. An excessively low rate of reduction of the transient target slip speed results in considerable slipping of the lock-up clutch for a long period of time, leading to deteriorated durability of the clutch, while an excessively high rate of reduction of the transient target slip speed results in instability of power transmission through the partially engaged lock-up clutch, leading to stepped increase of the torque transmitted through the lock-up clutch and deteriorated running stability and comfort of the vehicle.

SUMMARY OF THE INVENTION

It is therefore an object of the present invention to provide an apparatus which assures improved stability of control of the amount of slip of a lock-up clutch of a motor vehicle.

The above object may be achieved according to a first aspect of the present invention, which provides an apparatus for controlling an amount of slip of a lock-up clutch disposed between a pump impeller and a turbine impeller in a fluid-filled power transmitting device of a motor vehicle, the apparatus including slip control means for controlling the amount of slip of the lock-up clutch while a running condition of the vehicle is in a predetermined slip control area, such that an actual slip speed of the lock-up clutch coincides with a transient target slip speed, the apparatus comprising: (a) final target slip speed calculating means for calculating a final target slip speed of the lock-up clutch which assures a maximum fuel economy of the vehicle during a steady-state running of the vehicle; (b) initial target slip speed setting means for setting, as an initial value of the transient target slip speed of the lock-up clutch, a speed difference between speeds of the pump and turbine impellers immediately before an operation of the slip control means is initiated; and (c) target slip speed updating means for changing the transient target slip speed toward the final target slip speed at a rate which decreases as the transient target slip speed approaches the final target slip speed.

In the slip control apparatus of the present invention constructed as described above, the transient target slip speed whose initial value is set by the initial target slip speed setting means is updated by the target slip speed updating means, namely, so that the transient target slip speed is reduced down to the final target slip speed calculated by the final target slip speed calculating means. The rate at which the transient target slip speed is reduced decreases as the transient target slip speed approaches the final target value.

In the present slip control apparatus, the rate of reduction of the transient target speed is not suddenly zeroed but is progressively reduced as the transient target slip speed approaches the final target slip speed. This arrangement permits the actual slip speed of the lock-up clutch to accurately coincide with the final target value, without a control overshoot which would cause the actual slip speed to become close to zero and which would lead to deteriorated running stability and comfort of the vehicle.

The above object may also be achieved according to a second aspect of this invention, which provides an apparatus for controlling an amount of slip of a lock-up clutch disposed between a pump impeller and a turbine impeller in a fluid-filled power transmitting device of a motor vehicle, the apparatus including slip control means for controlling the amount of slip of the lock-up clutch while a running condition of the vehicle is in a predetermined slip control area, such that an actual slip speed of the lock-up clutch coincides with a target slip speed, the apparatus comprising: (a) slip speed monitoring means for determining whether a speed difference between speeds of the pump and turbine impellers tends to be increasing; and (b) enabling means for enabling the slip control means to initiate a slip control operation to control the amount of slip of the lock-up clutch, if the slip speed monitoring means determines that the speed difference does not tend to be increasing.

In the slip control apparatus constructed according to the second aspect of this invention, the slip speed monitoring means determines whether the speed difference of the pump and turbine impellers tends to be increasing or not, and if the speed difference does not tend to be increasing, the enabling means enables the slip control means to initiate the slip control operation to control the slip amount or slip speed of the lock-up clutch.

Thus, the slip control of the lock-up clutch by the slip control means is initiated only when the vehicle is running without a tendency of increase of the speed difference of the pump and turbine impellers. This arrangement permits the actual slip speed of the lock-up clutch to accurately follow the target slip speed even in an initial period of the slip control, and does not suffer from unstable control of the slip amount of the clutch which would lead to deteriorated running stability and comfort of the vehicle.

Preferably, the slip speed monitoring means comprises means for determining whether a rate of increase of an opening of a throttle valve of an engine of the vehicle drops below a predetermined first threshold. In this case, the enabling means enables the slip control means to initiate the slip control operation of the lock-up clutch when the rate of increase of the throttle valve opening drops below the predetermined first threshold. The first threshold valve may be a comparatively small positive value or a negative value close to zero. Where this threshold is a negative value, the slip control of the lock-up clutch is initiated when an accelerator pedal of the vehicle is released to reduce the throttle valve opening, that is, when the speed difference of the pump and turbine impellers tends to be decreasing. This arrangement therefore assures improved stability of control of the slip amount of the lock-up clutch even in an initial period of the slip control.

In the above case, the apparatus preferably further comprises slip control terminating means for commanding the slip control means to terminate the slip control operation when the rate of increase of the throttle valve exceeds a predetermined second threshold value which is sufficiently larger than the first threshold value. In this arrangement, the slip control operation is terminated even when the vehicle running condition is in the slip control area, if the throttle valve is operated at a comparatively high rate with the accelerator pedal being depressed abruptly. Thus, the instant arrangement is effective to prevent otherwise possible knocking tendency of the engine due to an excessively small amount of slip of the lock-up clutch when the engine speed is relatively low. Further, the termination of the slip control of the lock-up clutch results in amplification of a torque by the fluid-filled power transmitting device, facilitating the acceleration of the vehicle.

The object indicated above may also be achieved according to a third aspect of this invention, which provides an apparatus for controlling an amount of slip of a lock-up clutch disposed between a pump impeller and a turbine impeller in a fluid-filled power transmitting device of a motor vehicle having an engine and an accelerator pedal, the apparatus including slip control means for controlling the amount of slip of the lock-up clutch while a running condition of the vehicle is in a predetermined slip control area, such that an actual slip speed of the lock-up clutch coincides with a target slip speed, the apparatus comprising: (a) engine racing monitoring means for determining whether a speed of the engine of the vehicle has almost reached a highest level which is expected to be established due to racing of the engine upon depression of the accelerator pedal and consequent switching of a torque transmitting direction from a negative direction to a positive direction, the negative direction being a direction from a drive wheel of the vehicle toward the engine while the positive direction being a direction from the engine toward the drive wheel; and (b) enabling means for enabling the slip control means to initiate a slip control operation to control the amount of slip of the lock-up clutch if the engine racing monitoring means determines that the speed of the engine has almost reached the highest level.

In the slip control apparatus according to the third aspect of this invention, the engine racing monitoring means determines whether the engine speed has almost reached the highest level expected to be established due to the engine racing upon depression of the accelerator pedal and consequent switching of the torque transmitting direction from the negative direction to the positive direction. The enabling means enables the slip control means to initiate the slip control operation only after the engine racing has progressed to such an extent that the engine speed has almost reached the highest level of racing.

Thus, the slip control apparatus indicated above is adapted to initiate the slip control of the lock-up clutch only after the engine speed has been raised to a level near the highest level expected during the engine racing. This arrangement permits the actual slip speed of the lock-up clutch to accurately follow the target slip speed even at the beginning of the slip control operation, and does not suffer from unstable control of the slip amount which would lead to deteriorated running stability of the vehicle.

Preferably, the engine racing monitoring means comprises an idling position switch which is held on while a throttle valve of the engine is placed in an idling position, and means for determining whether a time which has passed after the idling position switch is turned off exceeds a predetermined threshold. In this case, the enabling means enables the slip control means to initiate the slip control operation of the lock-up clutch when the time which has passed after the idling switch is turned off exceeds the predetermined threshold.

The object indicated above may also be achieved according to a fourth aspect of this invention, which provides an apparatus for controlling an amount of slip of a lock-up clutch disposed between a pump impeller and a turbine impeller in a fluid-filled power transmitting device of a motor vehicle, the lock-up clutch having a piston, the apparatus including slip control means for controlling the amount of slip of the lock-up clutch while a running condition of the vehicle is in a predetermined slip control area, such that an actual slip speed of the lock-up clutch coincides with a target slip speed, the apparatus comprising: (a) initiating condition monitoring means for determining whether a condition of the vehicle for initiating a slip control operation of the slip control means is satisfied; (b) lock-up piston advancing means for advancing the piston of the lock-up clutch by a predetermined distance if the initialing condition monitoring means determines that the condition of the vehicle is satisfied; and (c) monitoring and enabling means for determining whether the piston has been advanced by the predetermined distance by the lock-up piston advancing means, and enabling the slip control means to initiate a slip control operation to control the amount of slip of the lock-up clutch after the piston has been advanced by the predetermined distance.

In the slip control apparatus according to the fourth aspect of this invention, the piston of the lock-up clutch is advanced by the predetermined distance by the lock-up piston advancing means when the initiating condition monitoring means determines that the vehicle condition for initiating the slip control operation is satisfied. The monitoring and enabling means enables the slip control means to initiate the slip control operation when it is determined that the piston has been advanced by the predetermined distance.

In the above apparatus, the slip control operation by the slip control means is initiated only after the piston of the lock-up clutch has been advanced by the predetermined distance. This arrangement permits slipping engagement of the lock-up clutch immediately after the initiation of the slip control operation, and therefore permits the actual slip speed of the lock-up clutch to accurately follow the target slip speed. The instant arrangement does not suffer from a control overshoot which causes the actual slip speed to become close to zero and which would lead to deterioration of the running stability and comfort of the vehicle.

Preferably, the piston of the lock-up clutch is axially slidably fitted on a hub of the turbine impeller of the fluid-filled power transmitting device, and is movable between a fully releasing position and a fully engaging position by a difference between hydraulic pressures in two oil chambers which are partially defined by the piston. With the piston placed in the fully releasing and engaging positions, the lock-up clutch is fully released and engaged, respectively. The lock-up piston advancing means may be adapted to establish a predetermined pressure difference of the two oil chambers so that the piston is advanced from the fully released position toward the fully engaged position by the predetermined distance by the established pressure difference, whereby the lock-up clutch is brought to a position near the fully engaged position in which the frictional coupling portion of the clutch contacts the corresponding frictional coupling portion of the turbine impeller.

BRIEF DESCRIPTION OF THE DRAWINGS

The above and optional objects, features, advantages and technical significance of the present invention will be better understood by reading the following detailed description of a presently preferred embodiment of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENT

Figure 1:
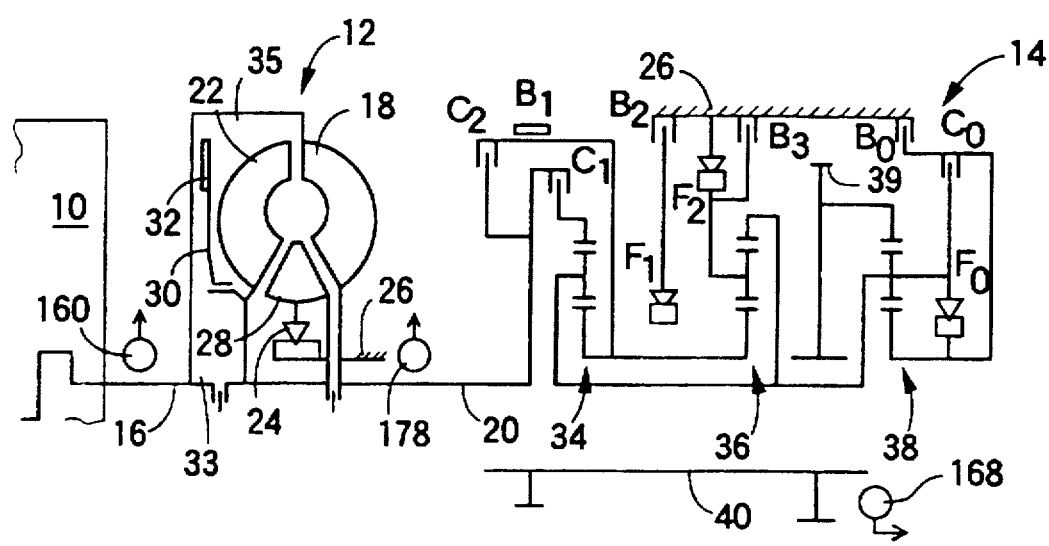
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
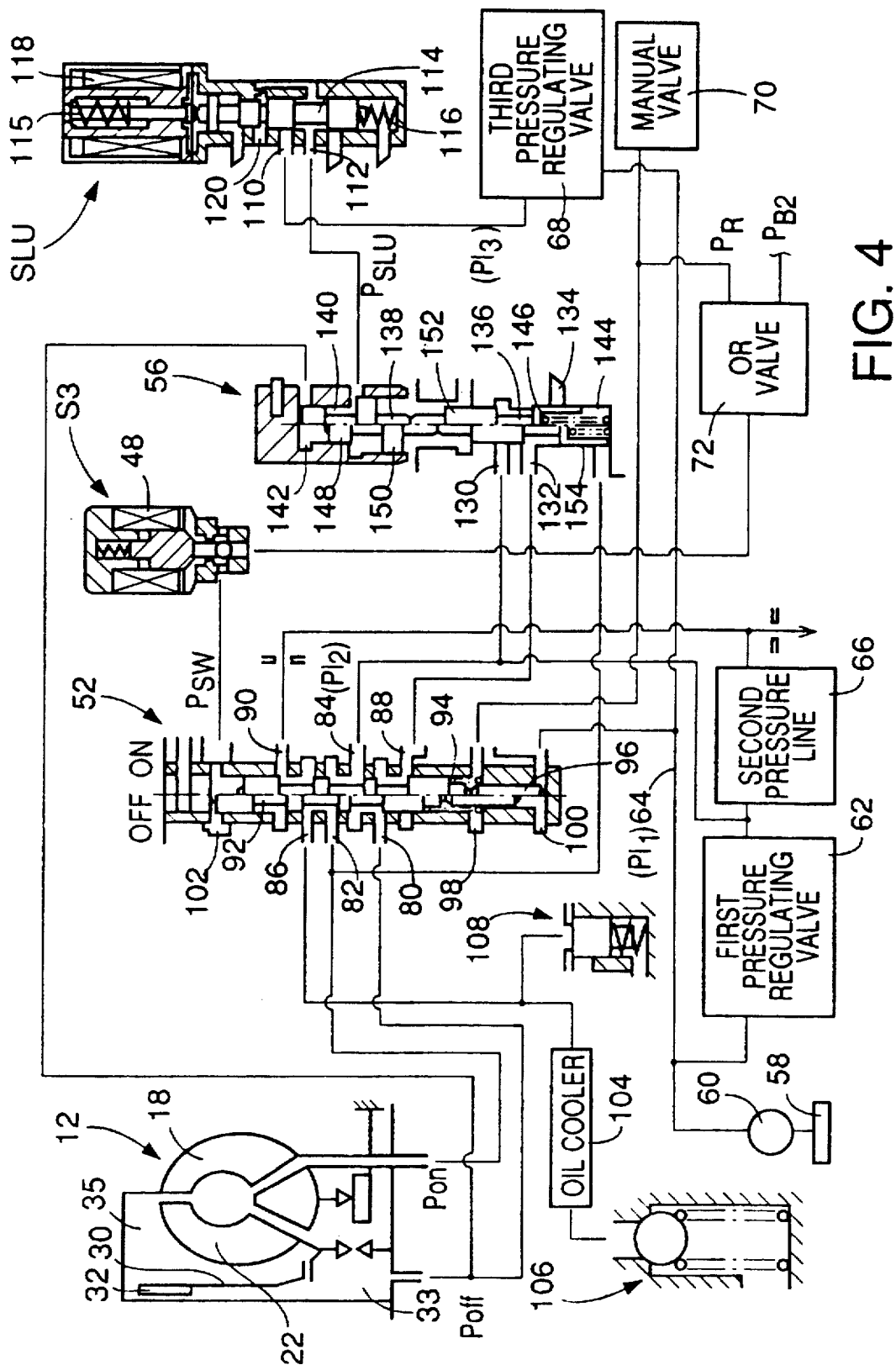
FIG. 4 is a view illustrating a part of a hydraulic control device shown in FIG. 3, which incorporates a circuit for controlling the lock-up clutch.
Figure 5:
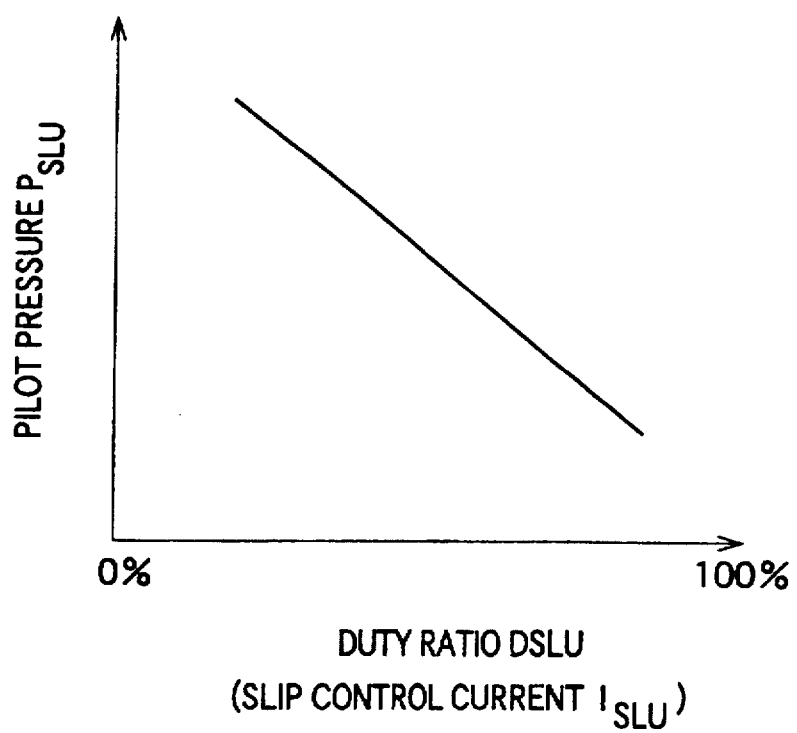
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve S3 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with- the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$, against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference $\Delta P$ (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference $\Delta P$.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference $\Delta P$ (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference $\Delta P$ changes with the pilot pressure $P_{SLU}$ as shown in FIG. 6, at a rate or gradient represented by a value (A2−A1)/A1 included in the following equation (1):

$$\Delta P = Pon - Poff = [(A2 - A1)/A1]P_{SLU} - Fs/A1 \quad (1)$$

where, Fs: biasing force of the spring 146.

Figure 6:
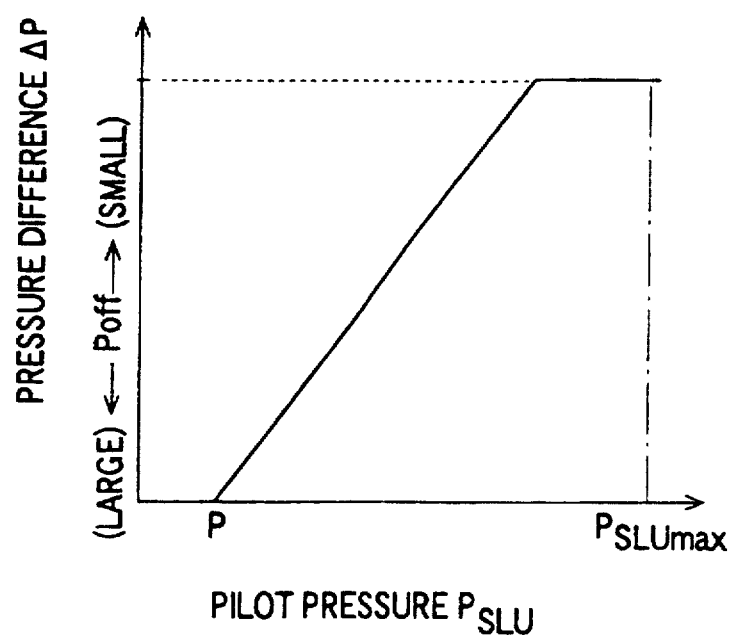
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference $\Delta P$ generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference $\Delta P$ of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P - N_T$) between a speed $N_P$ of the pump impeller 18 (speed $N_E$ of the engine 10) and a speed $N_T$ of the turbine impeller 22 (speed Nin of the input shaft 20).

Figure 3:
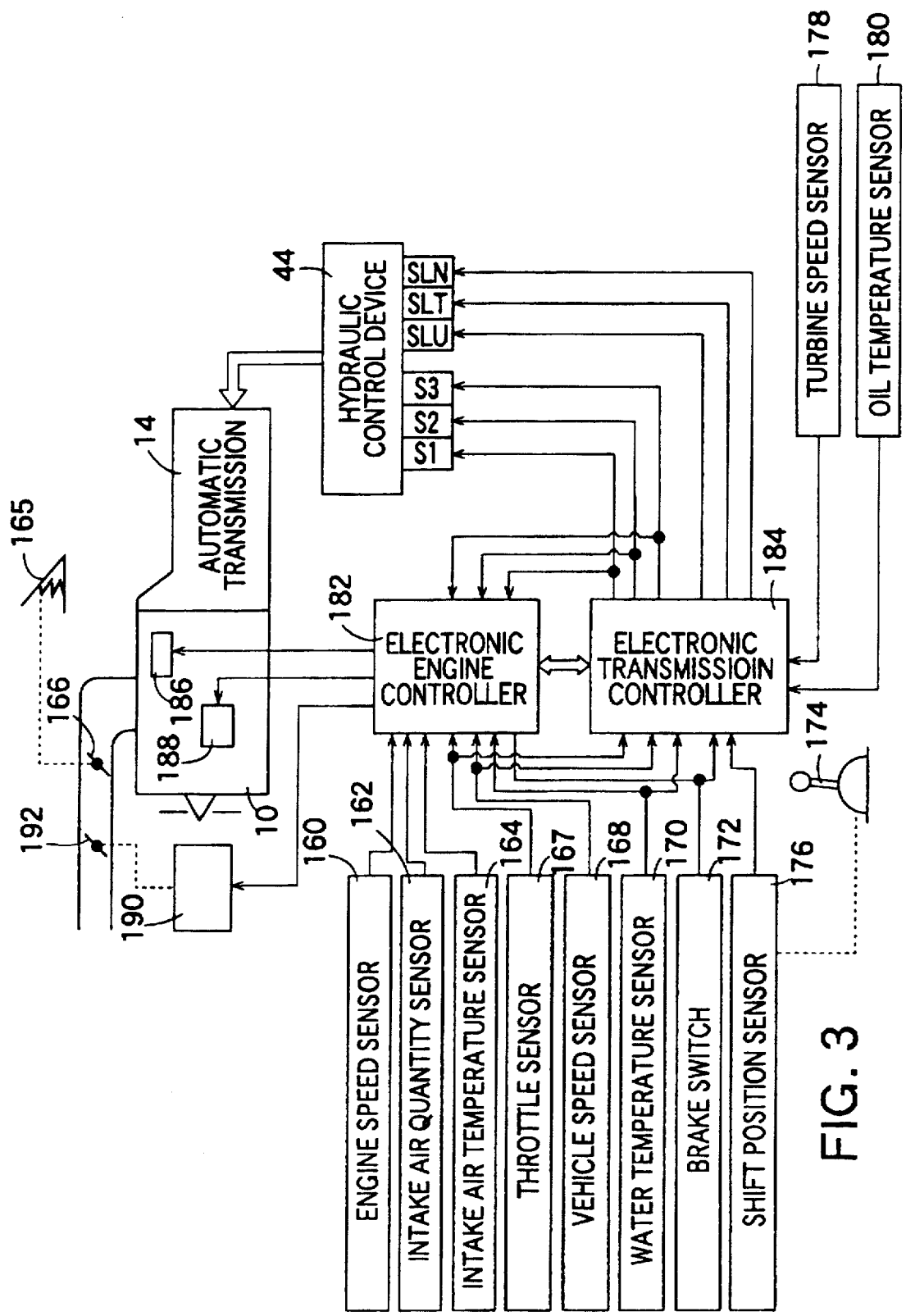
FIG. 3 is a block diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TAP of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TAP and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
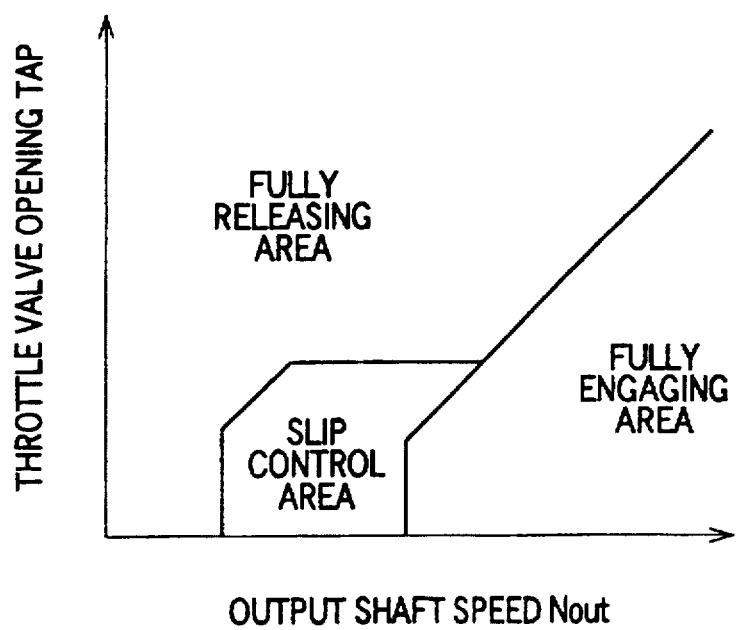
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening TAP and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a slipping state for transmitting power of the engine 10 to the automatic transmission 14 so as to maximize the fuel economy of the vehicle while absorbing a torque variation of the engine 10 to assure high power transmission stability and improved running stability or comfort of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle opening TAP is zero during the coasting of the vehicle.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU is adjusted according to the following equation (2) to control the amount of slip of the lock-up clutch 32 in a slip control mode:

$$I_{SLU}=K_P[E+(1/T1)\int\Delta E dt+T_D(d\Delta E/dt)]+f(TAP, N_T, N_{SLP}) \quad (2)$$

For instance, the SLIP CONTROL current $I_{SLU}$ is calculated to zero an error $\Delta E$ ($=N_{SLP}$–TNSLPBD) between a transient target slip speed TNSLPBD and the actual slip speed $N_{SLP}$ ($=N_E$–$N_T$) of the lock-up clutch 32. The second term f(TAP, $N_T$, $N_{SLP}$) of the right member of the above equation (2) is the feed forward term representative of a value which corresponds to the output of the engine 10 such as the output torque and which improves the response of the lock-up clutch 32.

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Figure 8:
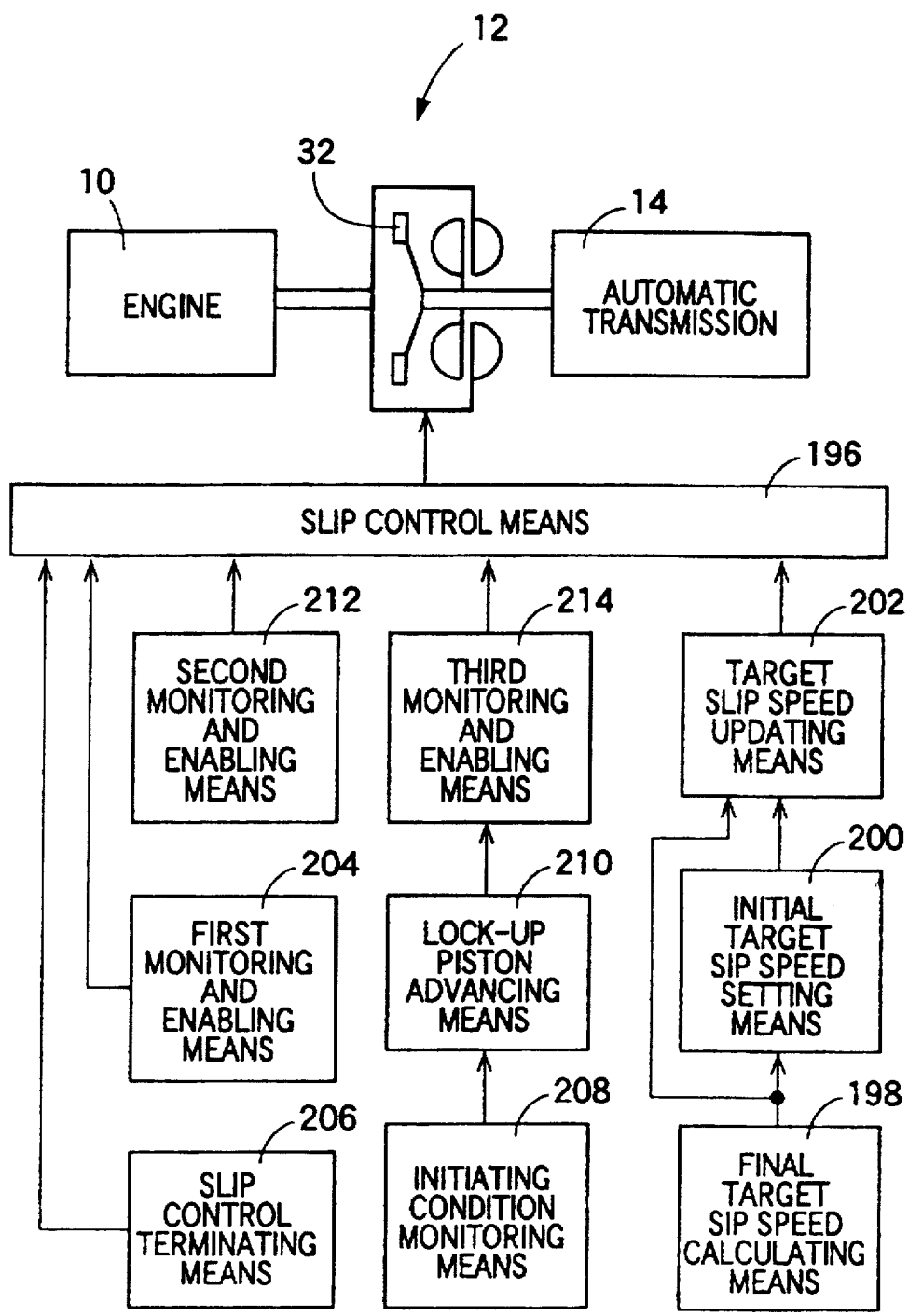
FIG. 8 is a block diagram illustrating the functions of various functional means incorporated in the slip control apparatus.

Referring next to the block diagram of FIG. 8, there will be described the functions of various functional means provided in the electronic transmission controller 184. That is, the transmission controller 184 incorporates slip control means 196, final target slip speed calculating means 198, an initial target slip speed setting means 200, target slip speed updating means 202, first monitoring and enabling means 204, slip control terminating means 206, initiating condition monitoring means 208, lock-up piston advancing means 210, second monitoring and enabling means 212, and third monitoring and enabling means 214.

When the vehicle running condition is determined to fall in the slip control area explained above by reference to FIG. 7, the slip control means 196 controls the amount of slip (slip speed $N_{SLP}$) of the lock-up clutch 32 such that the detected slip speed $N_{SLP}$ coincides with the transient target slip speed TNSLPBD. To this end, the final target slip speed calculating means 198 calculates or determines a final target slip speed TNSLPB that assures a maximum fuel economy of the vehicle during a steady-state running with the engine load (throttle opening angle TAP) held substantially constant. Further, the initial target slip speed setting means 200 sets the speed difference $\Delta N$ (=speed $N_P$ of the pump impeller 18—speed $N_T$ of the turbine impeller 22) as an initial value of the transient target slip speed TNSLPBD. After the initial value TNSLPBD is once set, the target slip speed updating means 202 updates the transient target slip speed TNSLPBD such that the transient target slip speed TNSLPBD is reduced at a rate or gradient which decreases as the transient target slip speed TNSLPBD approaches the final target slip speed TNSLPB.

The first monitoring and enabling means 204 includes slip speed monitoring means for determining whether the speed difference $\Delta N$ (=$N_P$–$N_T$) tends to be increasing, and first enabling means for enabling the slip control means 196 to initiate the slip control of the lock-up clutch 32 if the speed difference $\Delta N$ does not tend to be increasing. For example, the first monitoring and enabling means 204 enables the slip control means 196 to initiate the slip control operation when a rate of increase DTAP of the opening TAP of the throttle valve 166 drops below a predetermined threshold $\Delta\theta 1$, provided the other conditions are satisfied, as described below by reference to the flow chart of FIG. 9. The threshold value $\Delta\theta 1$ is a comparatively small positive value or a negative value close to zero. The slip control terminating means 206 commands the slip control means 196 to terminate the slip control when the rate of increase DTAP exceeds a predetermined threshold $\Delta\theta 2$ which is sufficiently larger than the threshold $\Delta\theta 1$.

The engine 10 will race with its speed $N_E$ abruptly rising, when the torque transmitting direction is switched from the negative direction to the positive direction. The negative direction is a direction from the drive wheels toward the engine 10, while the positive direction is a direction from the engine 10 toward the drive wheels. This switching of the torque transmitting direction occurs when the accelerator pedal 165 is depressed to terminate a coasting run of the vehicle with the throttle valve 166 placed in the idling position. The second monitoring and enabling means 212 includes an engine racing monitoring means for determining whether the engine speed $N_E$ has almost reached the highest level which is expected to be established due to the engine racing, and second enabling means for enabling the slip control means 196 to initiate the slip control of the lock-up clutch 32 if the engine speed $N_E$ is determined to have almost reached the expected highest level of engine racing.

The initiating condition monitoring means 208 determines whether the conditions for initiating the slip control by the slip control means 196 have been satisfied. The lock-up piston advancing means 210 operates to advance the piston 30 of the lock-up clutch 32 by a predetermined distance after the initiating condition monitoring means 208 determines that the initiating conditions have been satisfied. The third monitoring and enabling means 214 includes lock-up piston advancement monitoring means for determining whether the piston 30 has been advanced by the predetermined distance by the lock-up piston advancing means 210, and third enabling means for enabling the slip control means 196 to initiate the slip control of the lock-up clutch 32 after the piston 30 has been advanced by the predetermined distance.

Referring to the flow chart of FIG. 9, there will be described in detail the operation of the transmission controller 184 to control the lock-up clutch 32 selectively in the slip control mode (SA13) or in the non-slip-control mode (SA12).

Figure 9:
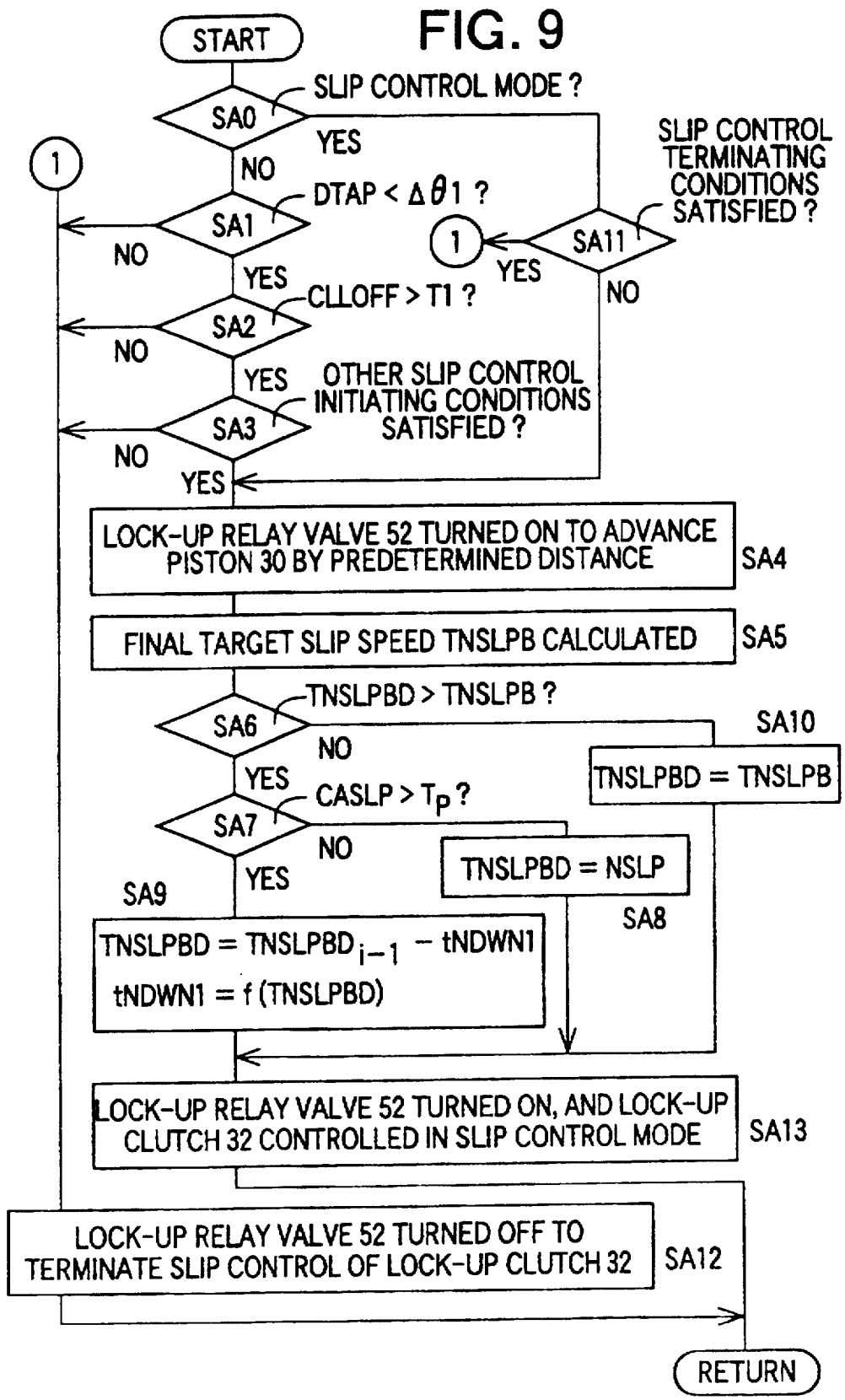
FIG. 9 is a flow chart schematically illustrating an operation of the slip control apparatus.
Figure 10:
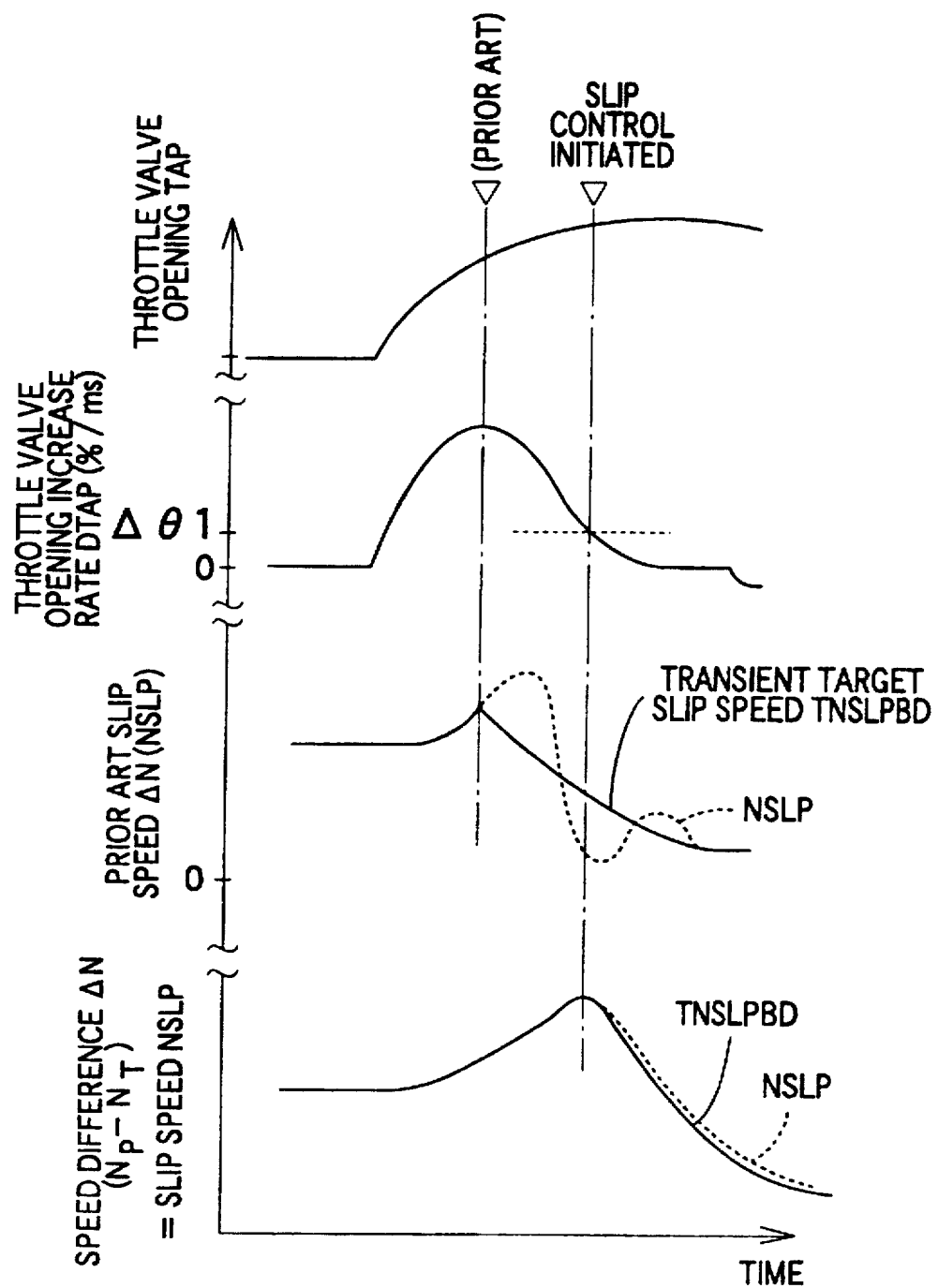
FIG. 10 is a time chart explaining the time at which the slip control of the lock-up clutch is initiated by the slip control apparatus during a throttle valve operation to accelerate the vehicle.

A routine illustrated in the flow chart of FIG. 9 is commenced with step SA0 to determine whether the lock-up clutch 32 is currently controlled in the slip control mode (with step SA13 once implemented as described below). If a negative decision (NO) is obtained in step SA0, the control flow goes to step SA1 to determine whether the rate of increase DTAP of the opening TAP of the first throttle valve 166 is lower than the threshold $\Delta\theta 1$. This threshold $\Delta\theta 1$ is a relatively small positive value or a negative value close to zero, for example, 1% per 30 ms. In an initial period of vehicle acceleration with the opening TAP of the throttle valve 166 being increased as indicated in FIG. 10, the speed difference $\Delta N$ between the speeds $N_P$ and $N_T$ of the pump and turbine impellers 18, 22 is increasing. Usually, however, the speed difference $\Delta N$ tends to start decreasing when the rate of increase DTAP of the opening of the throttle valve 166 has dropped below the predetermined threshold value $\Delta\theta 1$, as also indicated in FIG. 10. The speed difference $\Delta N$ is the slip speed $N_{SLP}$ of the lock-up clutch 32. Thus, step SA1 is provided to determine whether the vehicle is currently placed in the running condition in which the slip speed $N_{SLP}$ tends to be increasing or not. If the determination in step SA1 indicates that the speed difference $\Delta N$ or slip speed $N_{SLP}$ tends not to be increasing, step SA13 is implemented to enable the slip control means 196 to initiate the slip control of the lock-up clutch 32. It will be understood that a portion of the transmission controller 184 assigned to implement step SA1 constitutes the first monitoring and enabling means 204.

Figure 11:
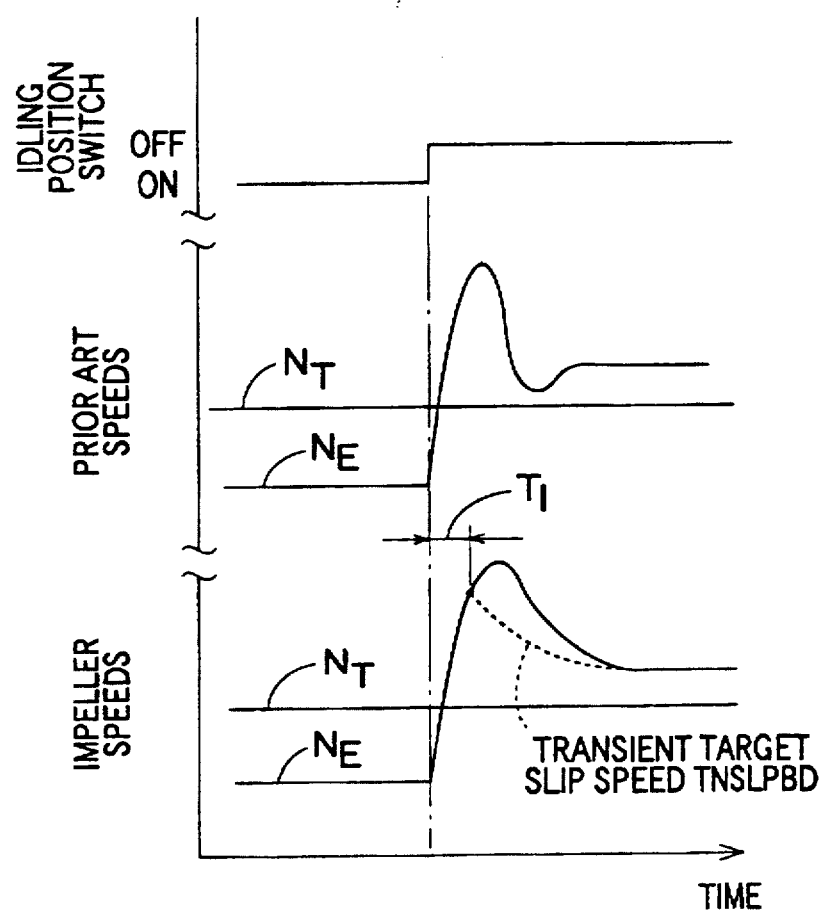
FIG. 11 is a time chart explaining the time at which the slip control is initiated by the slip control apparatus during a throttle valve operation to re-accelerate the vehicle after vehicle deceleration.

If a negative decision (NO) is obtained in step SA1, that is, if the slip speed $N_{SLP}$ of the lock-up clutch 32 tends to be increasing, the control flow goes to step SA12 to turn OFF the lock-up relay valve 52 to terminate the slip control. If the affirmative decision (YES) is obtained in step SA1, the control flow goes to step SA2 to determine whether a time CLLOFF which has passed after the idling position switch of the throttle sensor 167 is turned OFF at the end of vehicle deceleration has exceeded a predetermined threshold T1. In this respect, it is noted that if the accelerator pedal 165 is depressed to terminate coasting deceleration of the vehicle with the idling position switch held ON, the idling position switch is turned OFF, and the engine 10 races with its speed $N_E$ abruptly rising, as indicated in FIG. 11, due to the switching of the torque transmitting direction, namely, from the negative direction to the positive direction, upon depression of the accelerator pedal 165 at the end of coasting deceleration. The engine speed $N_E$ will reach the highest level during the racing in a given time after the accelerator pedal 165 is depressed, namely, after the idling position switch is turned OFF. The threshold time T1 is determined to be a time (e.g., about 100 ms) during which the engine speed $N_E$ almost reaches the expected highest level during the racing. In the specific example of FIG. 11, the threshold T1 is slightly shorter than the time between the moment at which the idling position switch is turned OFF and the moment at which the speed $N_E$ of the racing engine 10 reaches the expected highest level. Thus, step SA2 is provided to determine whether the engine speed $N_E$ has almost reached the expected highest level during racing of the engine 10 which occurs upon depression of the accelerator pedal 165 during or the end of, or to terminate coasting deceleration of the vehicle with the throttle valve 166 held in the idling position. It will be understood that a portion of the transmission controller 184 assigned to implement step SA2 constitutes the second monitoring and enabling means 212.

If a negative decision (NO) is obtained in step SA2, the control flow goes to step SA12 to terminate the slip control of the lock-up clutch 32. If an affirmative decision (YES) is obtained in step SA2, the control flow goes to step SA3 to determine whether the other conditions for initiating the slip control have been satisfied. It will be understood that a portion of the controller 184 assigned to implement step SA3 constitutes the initiating condition monitoring means 208. The other conditions that should be satisfied to initiate the slip control operation include: that the vehicle running condition is in the slip control area as indicated in FIG. 7; that the opening TAP of the throttle valve 166 is smaller than a predetermined value, for example, 4%; and that the automatic transmission 14 is not in a shifting action. If a negative decision (NO) is obtained in step SA3, the control flow goes to step SA12 to terminate the slip control operation. If an affirmative decision (YES) is obtained in step SA3, the control flow goes to step SA4 to energize the coil of the third solenoid-operated valve S3 to turn ON the lock-up relay valve 52, whereby the pressure Poff in the releasing oil chamber 33 is increased by the action of the lock-up clutch control valve 56 to a level determined by the feed forward term of the above equation (2), since the first term (feedback term) of the right member of the equation (2) is zero. Accordingly, the piston 30 is advanced by a predetermined distance corresponding to the feed forward term. It will be understood that a portion of the controller 184 assigned to implement step SA4 constitutes the lock-up piston advancing means 210.

Step SA4 is followed by step SA5 corresponding to the final target slip speed calculating means 198. In this step SA5, the final target slip speed TNSLPB is calculated according to the following equation (3):

$$TNSLPB = TKDTAP \times TTNSLP2 + (1-TKDTAP) \times TTNSLP1 \quad (3)$$

Figure 12:
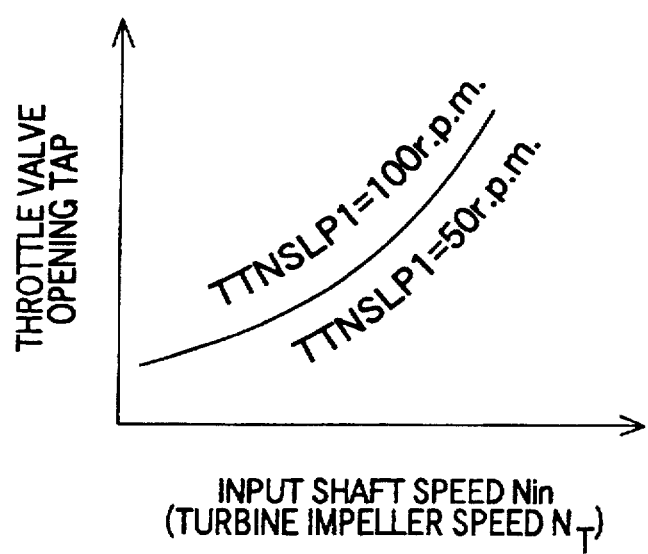
FIG. 12 is a graph indicating a relationship used to determine steady-state target slip speed TTNSLP1 used in step SA5 of the slip control routine of FIG. 9.

In the above equation (3), the parameter TTNSLP1 is a target slip speed of the lock-up clutch 32 during a steady-state running of the vehicle while the load on the engine 10 is substantially constant. For example, the target slip speed TTNSLP1 is determined on the basis of the turbine impeller speed $N_T$ and the throttle valve opening TAP and according to a predetermined relationship as indicated in FIG. 12. On the other hand, the parameter TTNSLP2 is a target slip speed during a rapid acceleration of the vehicle. For example, the target slip speed TTNSLP2 is about 500 r.p.m. The parameter TKDTAP is a coefficient expressed as a function of the rate of change DTAP of the throttle valve opening TAP. The coefficient TRKDTAP ($\leq$1) increases with an increase in the rate of change DTAP.

Then, the control flow goes to step SA6 to determine whether the transient target slip speed TNSLPBD is larger than the final target slip speed TNSLPB calculated in step SA5. In the first cycle of execution of the routine of FIG. 9, an affirmative decision (YES) is obtained in step SA6, and the control flow goes to step SA7 to determine whether a time CASLP which has passed after the affirmative decision (YES) is obtained in step SA3 exceeds a predetermined threshold $T_P$. This threshold time $T_P$ is determined to be sufficient to confirm that the piston 30 of the lock-up clutch 32 has been advanced by the predetermined distance with the lock-up relay valve 52 turned ON in step SA5. For example, the threshold $T_P$ is set at about 400 ms. Thus, step SA7 corresponds to the third monitoring and enabling means 214. Initially, a negative decision (NO) is obtained in step SA7, and the control flow goes to step SA8 corresponding to the initial target slip speed setting means 200. In this step SA8, the speed difference $\Delta N$ ($=N_P-N_T$) of the pump and turbine impellers 18, 22, namely, the current slip speed $N_{SLP}$ of the lock-up clutch 32 (immediately before the initiation of the slip control operation) is set as an initial value of the transient target slip speed TNSLPBD. The point of time at which step SA8 is implemented is indicated at "t1" in the graph of FIG. 13.

Then, the control flow goes to step SA13 corresponding to the slip control means 196, in which the lock-up relay valve 52 is turned ON, and the SLIP CONTROL current $I_{SLU}$ applied to the linear solenoid valve SLU is controlled according to the above equation (2) to control the amount of slipping engagement of the lock-up clutch 32 so that the actual slip speed $N_{SLP}$ coincides with the initial transient target slip speed TNSLPBD determined in step SA8. Thus, one cycle of execution of the routine of FIG. 9 is completed.

In the next cycle of execution of the routine, an affirmative decision (YES) is obtained in step SA0, and step SA11 corresponding to the slip control terminating means 206 is implemented to determine whether the conditions for terminating the slip control of the lock-up clutch 32 are satisfied. These conditions include a condition that the rate of increase DTAP of the opening TAP of the throttle valve 166 exceeds a predetermined threshold $\Delta\theta 2$ (e.g., 10%/30 ms), which is sufficiently larger than the threshold $\Delta\theta 1$ (e.g., 1%/30 ms) used in step SA1. Initially, a negative decision (NO) is obtained in step SA11, and the control flow goes to step SA4.

Figure 14:
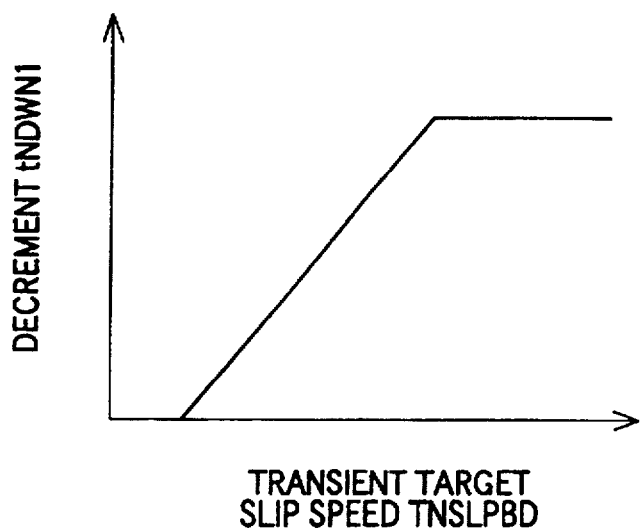
FIG. 14 is a graph indicating an amount of decrement of the transient target slip speed which is determined in the slip control routine of FIG. 9.

With the routine repeatedly executed, an affirmative decision (YES) is obtained in step SA7, namely, the piston 30 of the lock-up clutch 32 has been advanced by the predetermined distance to a position relatively near the fully engaged position. The point of time at which the affirmative decision is obtained in step SA7 is indicated at "t2" in FIG. 13. In this case, step SA7 is followed by step SA9 corresponding to the target slip speed updating means 202. In this step SA9, the transient target slip speed TNSLPBD is changed or updated, that is, reduced according to the following equation (4):

$$TNSLPBD_i = TNSLPBD_{i-1} - tNDWN1 \qquad (4)$$

where, $TNSLPBD_{i-1}$: transient target slip speed in the last cycle tNDWN1: decrement of TNSLPBD The decrement tNDWN1 by which the transient target slip speed TNSLPBDi is reduced toward the final target slip speed TNSLPB is determined as a function of the current transient target slip speed TNSLPBD, as indicated in the graph of FIG. 14. Described more particularly, the decrement tNDWN1 decreases as the transient target slip speed TNSLPBD approaches or nears the final target slip speed TNSLPB calculated in step SA5. As is apparent from the above equation (4), the transient target slip speed TNSLPBDi used in each cycle of execution of the routine is calculated by subtracting the currently determined decrement tNDWN1 from the transient target slip speed $TNSLPBD_{i-1}$ used in the last cycle. It will therefore be understood that the decrement tNDWN1 determined as a function of the transient target slip speed TNSLPBD in each cycle of execution determines the rate at which the transient target slip speed TNSLPBD is reduced down to the final target slip speed TNSLPB. Thus, the rate of reduction of the transient target slip speed TNSLPBD toward the final target slip speed TNSLPB decreases as the transient target slip speed TNSLPBD approaches the final target slip speed TNSLPB.

Since the transient target slip speed TNSLPBD is decremented as described above, the slip speed TNSLPBD eventually coincides with the final target slip speed TNSLPB after the routine has been repeated a given number of cycles. Thus, a negative decision (NO) is obtained in step SA6, and step SA10 is implemented to fix the transient target slip speed TNSLPBD at the final target slip speed TNSLPB. The point of time at which step SA10 is implemented is indicated at "t3" in FIG. 13.

Figure 13:
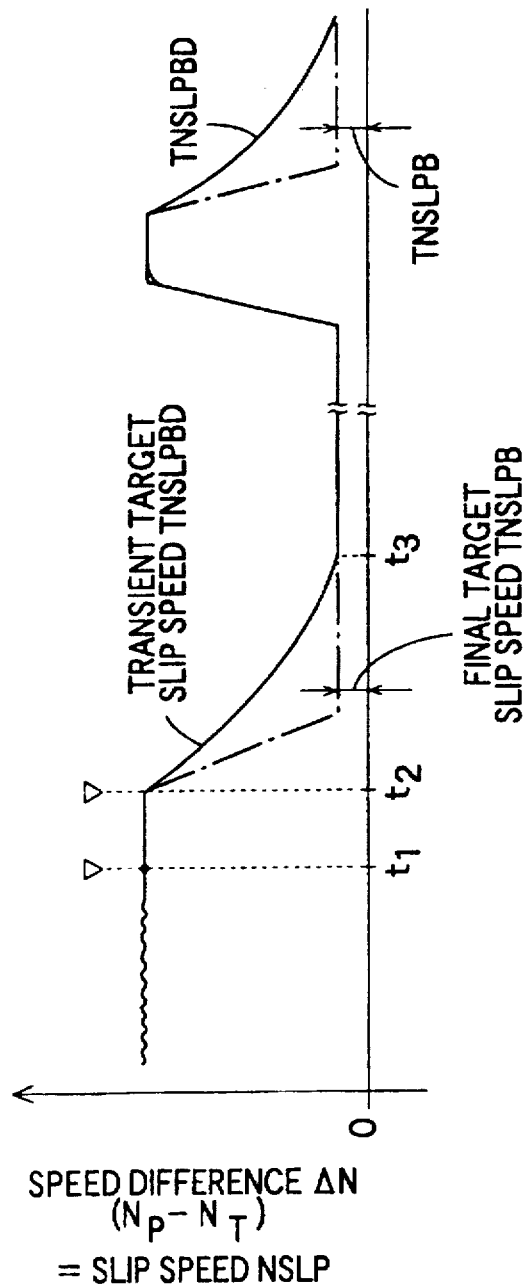
FIG. 13 is a time chart indicating a change in the transient target slip speed after the satisfaction of the slip control initiating conditions, such that the rate of change of the transient target slip speed is lowered as the transient target slip speed approaches a final target slip speed.

In the slip control apparatus constructed according to the present embodiment which has been described, the transient target slip speed TNSLPBD is initially set at the initial value by the initial target slip speed setting means 200 in step SA8. Thereafter, the transient target slip speed TNSLPBD is decremented or reduced by the target slip speed updating means 202 in step SA9, toward the final target slip speed TNSLPB calculated by the final target slip speed calculating means 198 in step SA5, such that the rate of reduction of the transient target slip speed TNSLPBD decreases as the transient target slip speed TNSLPBD approaches the final target slip speed TNSLPB, as indicated in the graph of FIG. 13. This arrangement assures smooth slow reduction of the transient target slip speed TNSLPBD down to the final value TNSLPB as indicated by solid line in FIG. 13, contrary to the conventional linear reduction which involves sudden zeroing of the rate of reduction of the transient target slip speed as indicated by one-dot chain line in FIG. 13. Thus, the present embodiment permits the actual slip speed $N_{SLP}$ of the lock-up clutch 32 to accurately coincide with the final target value TNSLPB, without a control overshoot which would cause the actual slip speed to become close to zero and which would lead to deteriorated running stability and comfort of the vehicle.

In the present embodiment, the first monitoring and enabling means 204 includes the slip speed monitoring means which determines in step SA1 whether the difference ΔN between the speeds $N_P$ and $N_T$ of the pump and turbine impellers 18, 22 tends to be increasing or not, and further includes the first enabling means which enables the slip control means 196 to initiate the slip control operation of the lock-up clutch 32 in step SA13 if it is determined that the speed difference ΔN does not tend to be increasing. This arrangement is also effective to permit the actual slip speed $N_{SLP}$ to accurately follow the transient target slip speed TNSLPBD which is determined from time to time. Thus, the present embodiment assures improved stability of control of the slip amount of the lock-up clutch 32, and accordingly enhanced running stability and comfort of the vehicle.

Described more specifically, the first monitoring and enabling means 204 is arranged to enable the slip control means 196 to initiate the slip control operation when the rate of increase DTAP of the opening TAP of the throttle valve 166 drops below the predetermined threshold Δθ1. As indicated in the graph of FIG. 10, the threshold Δθ1 is selected to be a comparatively small positive value or a negative value close to zero. It is desirable that the threshold Δθ1 be a negative value, because the affirmative decision (YES) is obtained in step SA2 when the accelerator pedal 165 is released, that is, when the speed difference ΔN (=$N_P$-$N_T$) begins to be decreasing. In other words, the use of a negative value for the threshold Δθ1 causes the slip control operation to be initiated only after the speed difference ΔN tends to be decreasing, whereby the slip control stability is further improved.

The present embodiment is also adapted such that the slip control terminating means 206 terminates the slip control operation in step S13A if the rate of increase DTAP of the throttle valve opening TAP exceeds the predetermined threshold Δθ2 sufficiently larger than the threshold Δθ1. In this arrangement, the slip control operation is terminated even when the vehicle running condition is in the slip control area of FIG. 7, if the throttle valve 166 is operated at a comparatively high rate with the accelerator pedal 165 being depressed abruptly. Thus, the instant arrangement is effective to prevent otherwise possible knocking tendency of the engine 10 due to an excessively small amount of slip of the lock-up clutch when the engine speed is relatively low. Further, the termination of the slip control of the lock-up clutch 32 in such condition results in effective amplification of a torque by the torque converter 12, facilitating the acceleration of the vehicle.

Further, the second monitoring and enabling means 212 includes the engine racing monitoring means which determines in step SA2 whether the engine speed $N_E$ has almost reached the highest level expected to be established due to the engine racing upon depression of the accelerator pedal 165 and consequent switching of the torque transmitting direction from the negative direction to the positive direction. The second monitoring and enabling means 212 also includes the second enabling means which enables the slip control means 196 to initiate the slip control operation only after the engine racing has progressed to such an extent that the engine speed has almost reached the highest level of racing. Thus, the present slip control apparatus indicated above is adapted to initiate the slip control operation of the lock-up clutch 32 in step SA13 only after the engine speed has been raised to a level near the highest level expected during the engine racing. This arrangement permits the actual slip speed $N_{SLP}$ of the lock-up clutch 32 to accurately follow the target slip speed TNSLPB even at the beginning of the slip control operation, and does not suffer from unstable control of the slip amount which would lead to deteriorated running stability of the vehicle.

Described more specifically, the engine racing monitoring means of the second monitoring and enabling means 212 determines whether the time CLLOFF which has passed after the idling position switch of the throttle sensor 167 is turned off exceeds a predetermined threshold T1. The second enabling means enables the slip control means 196 to initiate the slip control operation of the lock-up clutch when the time CLLOFF exceeds the predetermined threshold T1. The threshold T1 is determined to be shorter by a predetermined time than the time period between the moment at which the idling position switch is turned OFF and the moment at which the expected highest speed of the engine racing is reached. The predetermined time is set to be substantially equal to the expected time lag before the slip control by the slip control means 196 begins to influence the actual slip speed $N_{SLP}$, so that the effective slip control of the clutch 32 is initiated when the expected highest speed of the engine racing has been reached.

The present embodiment is further adapted such that if the initiating condition monitoring means 208 determines in step SA3 that the vehicle condition for initiating the slip control operation is satisfied, the lock-up piston advancing means 210 advances the piston 30 of the lock-up clutch 32 by the predetermined distance to the position relatively near the fully engaged position, and the third monitoring and enabling means 214 enables the slip control means 196 to initiate the slip control operation after the piston 30 has been advanced by the predetermined distance. This arrangement permits slipping engagement of the lock-up clutch immediately after the initiation of the slip control operation, and therefore permits the actual slip speed $N_{SLP}$ of the lock-up clutch to accurately follow the target slip speed TNSLPBD. The instant arrangement does not cause a control overshoot which causes the actual slip speed to become close to zero and which would lead to deterioration of the running stability and comfort of the vehicle.

In the illustrated embodiment, the piston 30 of the lock-up clutch 32 is axially slidably fitted on the hub of the turbine impeller 22 of the torque converter 12, and is movable between the fully releasing position and the fully engaging position by the pressure difference of the releasing and engaging oil chambers 33, 35 which are partially defined by the piston 30. The lock-up piston advancing means 210 is adapted to control the pressure in the releasing oil chamber 33 to a predetermined level while the pressure in the engaging oil chamber 35 is held at the predetermined higher level, whereby the piston 30 is advanced by the oil flow within the torque converter 12 from the pump impeller 18, to a position near the fully engaged position in which the frictional coupling portion of the clutch 30 contacts the corresponding frictional coupling portion of the turbine impeller 22.

While the present invention has been described in detail in its presently preferred embodiment, it is to be understood that the invention is not limited to the details of the illustrated embodiment, but may be otherwise embodied.

For instance, the throttle valve opening TAP and the rate of increase DTAP of the opening TAP which are used as parameters for controlling the lock-up clutch 32 may be replaced by other variables indicative of the load currently acting on the engine 10, and values indicative of the rates of change of such variables. For example, the parameters TAP and DTAP may be replaced by the amount of operation of the accelerator pedal 165 and the rate of change of this operation amount, or the amount of fuel injection into the engine 10 and the rate of change of this fuel injection amount, or the intake air quantity Q of the engine 10 and the rate of change of this quantity.

In step SA1 of FIG. 9 of the illustrated embodiment, the rate of increase DTAP (%/ms) of the opening TAP of the throttle vale 166 is used in determining whether the difference $\Delta N$ between the speeds $N_P$ and $N_T$ of the pump and turbine impellers 18, 22, which is the slip speed $N_{SLU}$ of the lock-up clutch 32, tends to be increasing or not. That is, the first monitoring and enabling means 204 determines that the slip speed $N_{SLU}$ tends to be increasing if or when the rate of increase DTAP drops below the predetermined threshold $\Delta \theta 1$. However, the increasing tendency of the slip speed $N_{SLU}$ may be determined on the basis of the rate of change of the speed difference $\Delta N$ (=$N_P$-$N_T$) of the pump and turbine impellers 18, 22, which rate of change is calculated by calculating the speed difference $\Delta N$ at a predetermined interval.

In step SA2 of the illustrated embodiment, the time CLLOFF which has passed after the idling position switch of the throttle sensor 167 is turned OFF during vehicle deceleration is compared with the predetermined threshold T1, to determine whether the engine speed $N_E$ has almost reached the highest level expected to be established due to racing of the engine 10 upon switching of the torque transmitting direction from the negative direction to the positive direction due to depression of the accelerator pedal 165. However, this determination may be effected depending upon whether the rate of increase of the engine speed $N_E$ becomes lower than a predetermined threshold.

Although the hydraulic control device 44 is arranged as illustrated in FIG. 4, the construction of the device 44 may be modified as needed. For example, the lock-up relay valve 52 and the lock-up clutch control valve 56 may be combined into a unitary structure.

While the illustrated embodiment is adapted to permit the slip control operation of the lock-up clutch 32 to be initiated when the predetermined time $T_P$ has passed after the piston 30 has been advanced, the slip control operation may be initiated when the predetermined distance of advancement of the piston 30 is actually detected.

Although the automatic transmission 14 is connected to the torque converter 12 equipped with the lock-up clutch 32, the torque converter 12 may be replaced by other fluid-filled power transmitting device equipped with a lock-up clutch, such as a fluid-coupling equipped with a lock-up clutch.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch disposed between a pump impeller and a turbine impeller in a fluid-filled power transmitting device of a motor vehicle having an engine and an accelerator pedal, said apparatus including slip control means for controlling the amount of slip of said lock-up clutch while a running condition of the vehicle is in a predetermined slip control area, such that an actual slip speed of said lock-up clutch coincides with a target slip speed, said apparatus comprising:

engine racing monitoring means for determining whether a speed of said engine of the vehicle has substantially reached a level which is expected to be established due to racing of the engine upon depression of said accelerator pedal and consequent switching of a torque transmitting direction from a negative direction to a positive direction, said negative direction being a direction from a drive wheel of the vehicle toward said engine while said positive direction being a direction from said engine toward said drive wheel; and enabling means for enabling said slip control means to initiate a slip control operation to control the amount of slip of said lock-up clutch if said engine racing monitoring means determines that the speed of said engine has almost reached said highest level.

2. An apparatus according to claim 1, wherein said engine racing monitoring means comprises an idling position switch which is held on while a throttle valve of the engine is placed in an idling position, and means for determining whether a time which has passed after said idling position switch is turned off exceeds a predetermined threshold, said enabling means enabling said slip control means to initiate said slip control operation when said time exceeds said predetermined threshold.

3. An apparatus according to claim 2, wherein said predetermined threshold is shorter by a predetermined time than a period of time between a moment at which said idling position switch is turned off and a moment at which the speed of the engine has reached said highest level, said predetermined time corresponding to a time lag between a moment of initiation of said slip control operation by said slip control means and a moment at which said slip control operation influences said actual slip speed of said lock-up clutch.

4. An apparatus according to claim 1, wherein said slip control means controls the amount of slip of said lock-up clutch) such that the actual slip speed of said lock-up clutch coincides with a transient target slip speed, said apparatus further comprising:

final target slip speed calculating means for calculating a final target slip speed of said lock-up clutch which assures a maximum fuel economy of the vehicle during a steady-state running of the vehicle;

initial target slip speed setting means for setting, as an initial value of said transient target slip speed of said lock-up clutch, a speed difference between speeds of said pump and turbine impellers immediately before an operation of said slip control means is initiated; and target slip speed updating means operable after said initial value of said transient target slip speed is set, for changing said transient target slip speed toward said final target slip speed at a rate which decreases as said transient target slip speed approaches said final target slip speed.

* * * * *